United States Patent [19]

Yao

[11] 4,114,172
[45] Sep. 12, 1978

[54] PHOTOGRAPHIC CAMERA AND FILM CARTRIDGE THEREFOR

[76] Inventor: Joe Yao, 204 Lampkin Rd., Starkville, Miss. 39762

[21] Appl. No.: 740,123

[22] Filed: Nov. 8, 1976

[51] Int. Cl.$^2$ .................... G03B 19/12; G03B 17/26
[52] U.S. Cl. .................................... 354/153; 354/275
[58] Field of Search ............ 354/152, 153, 154, 155, 354/156, 275, 288

[56] References Cited

U.S. PATENT DOCUMENTS

| | | | |
|---|---|---|---|
| 1,171,495 | 2/1916 | Beidler | 354/275 |
| 2,608,922 | 9/1952 | Studdert | 354/153 |
| 3,223,011 | 12/1965 | Hunt et al. | 354/275 |
| 3,440,942 | 4/1969 | Sauer | 354/153 |
| 3,608,456 | 9/1971 | Hauser | 354/154 X |
| 3,757,661 | 9/1973 | Ochiai et al. | 354/153 |
| 3,898,681 | 8/1975 | Hertel et al. | 354/275 X |
| 3,911,454 | 10/1975 | Ohmoie | 354/154 |
| 3,967,290 | 6/1976 | Waaske | 354/154 |
| 3,967,298 | 6/1976 | Adamski | 354/153 |

FOREIGN PATENT DOCUMENTS 845,154  6/1952  Fed. Rep. of Germany .......... 354/275

Primary Examiner—Donald A. Griffin

[57] ABSTRACT

A pocket size single lens reflex camera and a film cartridge for use therewith. The camera is constructed so that lines of light coming from an object being photographed is directed through an exposure window of the film cartridge within the camera body at a right angle to and aligned with the longitudinal axis of the take-up spool of the film cartridge as it enters the exposure window of the film cartridge. The film cartridge consists of a substantially nontransparent housing member having a strip of paper backed photographic film located in its interior. An exposure window is provided in one end of the housing member for allowing the film within the housing member to be selectively exposed. Indicia for indicating the number of exposures taken is provided on the paper backing of the film. An exposure indicia window is provided in the opposite end of the housing from the exposure window for allowing the exposure identifying indicia to be viewed. Means are provided for causing the paper backed side of the film to be outwardly directed adjacent the exposure indicia window while causing the emulsion side of the film to be outwardly directed adjacent the exposure window.

9 Claims, 10 Drawing Figures

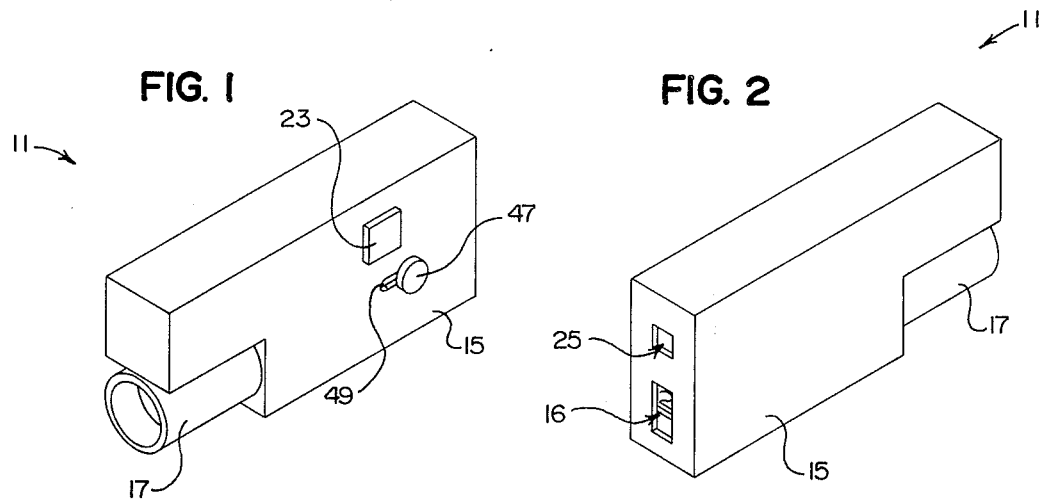
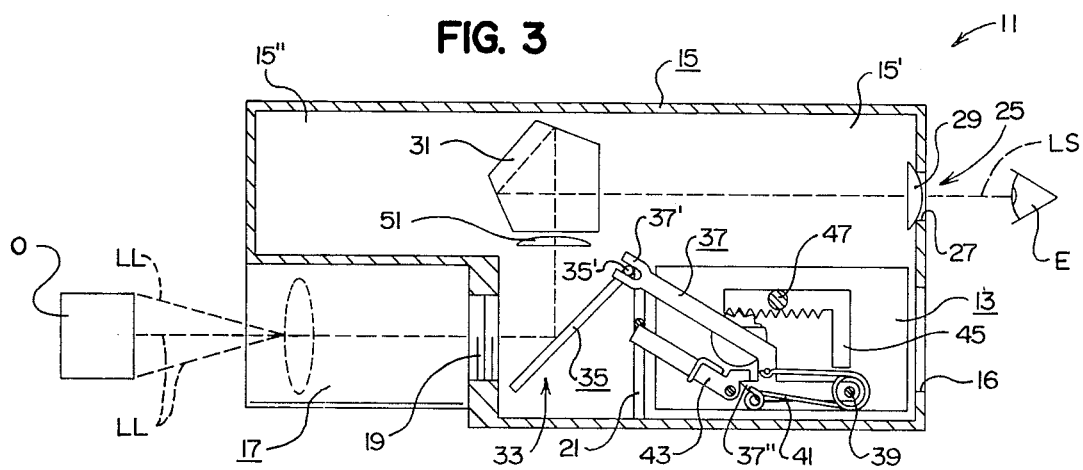
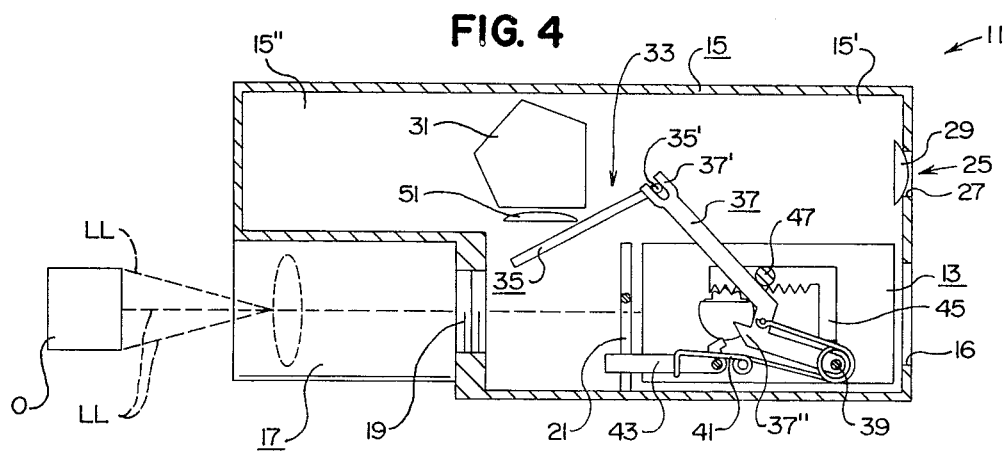

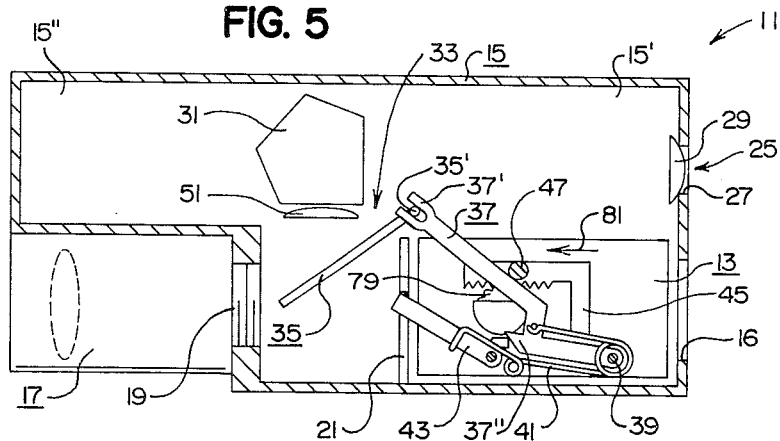
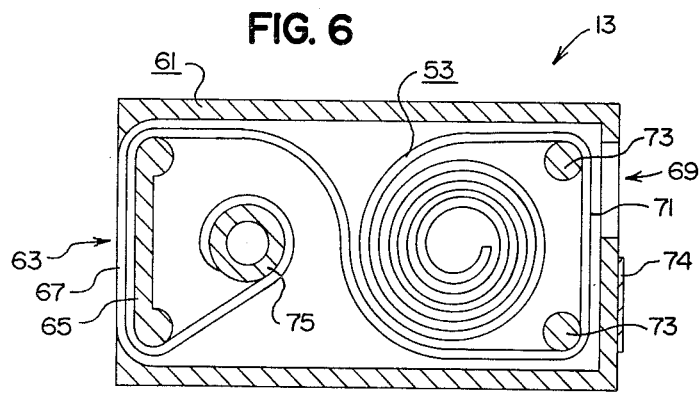
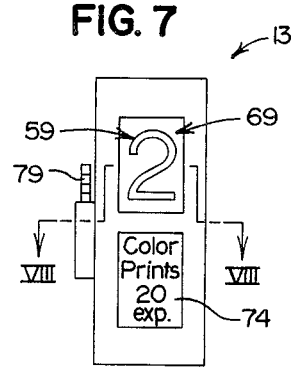
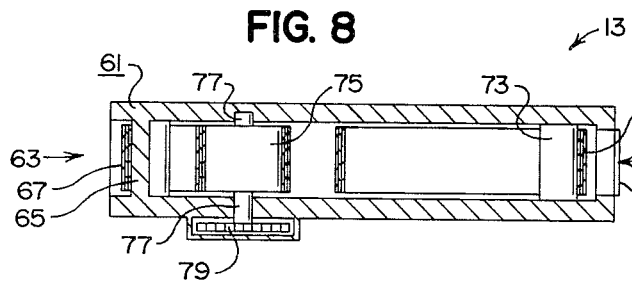
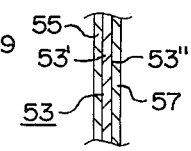
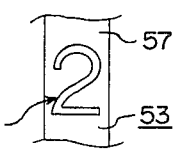

PHOTOGRAPHIC CAMERA AND FILM CARTRIDGE THEREFOR

BACKGROUND OF THE INVENTION

1. Field of the Invention

This invention relates to photographic cameras and to film cartridges for use therewith.

2. Background of the Invention

Heretofore, various photographic cameras and film cartridges for use therewith have been developed. See, for example, Victor, U.S. Pat. No. 1,682,873; Wittel, U.S. Pat. No. 2,059,834; Pearlman et al., U.S. Pat. No. 2,118,896; Weiss, U.S. Pat. No. 2,949,073; Takahama, U.S. Pat. No. 3,011,418; Domnick, U.S. Pat. No. 3,443,501; Ochiai et al., U.S. Pat. No. 3,757,661; and Takigawa et al., U.S. Pat. No. 3,896,465. None of the above patents disclose or suggest the present invention.

One prevailing problem with all prior photographic cameras and film cartridges for use therewith is that of making the cameras and film cartridges as small as possible while still being capable of producing photographs that are equal in quality to those produced by large, bulky cameras. The most common attempt to reduce the size of the cameras and film cartridges have been made by reducing the size of the film being used. Cameras using "110" film cartridges have now been developed that are "pocket size." One problem with the majority of the currently produced 110 cameras is the substantial lack of the see-your-picture precision or the see-through-the-lens feature therefor which adversely affects the quality of photographs obtainable therewith. The majority of the currently produced 110 cameras also lacks interchangeable lens therefor which adversely affects the versatility of the camera. A solution to this problem is to produce 110 cameras of the single lens reflex type with interchangeable or zoom lens supplying optical versatility. However, this solution commonly increases the size of the camera thereby adversely affecting the one big advantage of 110 cameras over 35 mm. single lens reflex cameras and the like.

SUMMARY OF THE INVENTION

The present invention is directed towards overcoming certain problems and disadvantages of prior photographic cameras and film cartridges for use therewith. The concept of this invention is to provide a photographic camera which is of true "pocket size" and which is capable of optical versatility.

The photographic camera of the present invention includes a hollow boxlike body means; lens means attached to the body means for allowing lines of light to pass between the interior of the body means and an object to be photographed; a film cartridge including a substantially nontransparent housing member, a strip of photographic film located within the housing member, an exposure window through the housing member for allowing the film to be selectively exposed to the lines of light passing through the lens means from the object being photographed, and a take-up spool for receiving the film after it has been exposed; and means for selectively directing the lines of light entering the interior of the body means to the exposure window of the film cartridge; the film cartridge being positioned within the interior of the body means with the lines of light passing between the lens means and the exposure window of the film cartrdge being located at a right angle to and substantially aligned with the longitudinal axis of the take-up spool of the film cartridge as it enters the exposure window of the film cartridge.

The film cartridge of the present invention includes an elongated strip of photographic film, the film having a first side covered with a photographic emulsion and having a second side covered with a paper backing, the paper backing having a series of numerical indicia provided thereon; a substantially nontransparent housing member for enclosing the film, the housing member including a first window means and including a first film support means for aligning a first portion of the film about the first window means with the photographhic emulsion of the first portion of the film being outwardly directed relative to the first window means, the housing member including a second window means and including means for aligning a second portion of the film about the second window means with the paper backing of the second portion of the film being outwardly directed relative to the second window means; take-up roller means mounted within the housing member aligned with the first window of the housing member for receiving the film after the film has passed the first window means of the housing member; and drive means for selectively causing the take-up roller means to rotate thereby causing the film to be wound around the take-up roller means.

BRIEF DESCRIPTION OF THE DRAWINGS

FIG. 1 is a perspective view of the photographic camera of the present invention as taken from substantially the front thereof.

FIG. 2 is a perspective view of the photographic camera of the present invention as taken from substantially the rear thereof.

FIG. 3 is a partially sectional view of the photographic camera of the present invention.

FIG. 4 is a partially sectional view of the photographic camera of the present invention substantially similar to FIG. 3 but showing various parts thereof in a moved position.

FIG. 5 is a partially sectional view of the photographic camera of the present invention substantially similar to FIGS. 3 and 4 but showing various parts thereof in a moved position.

FIG. 6 is a sectional view of the film cartridge of the present invention.

FIG. 7 is an end elevational view of the film cartridge of the present invention.

FIG. 8 is a partially sectional view of the film cartridge of the present invention as taken on line VIII—VIII of FIG. 7.

FIG. 9 is an enlarged setional view of a portion of the film of the film cartridge of the present invention.

FIG. 10 is an elevational view of a portion of the paper backing of the film of the film cartridge of the present invention.

DESCRIPTION OF THE PREFERRED EMBODIMENT

The photographic camera 11 (see FIGS. 1, 2, 3, 4 and 5) of the present invention is for use with a film cartridge 13 (see FIGS. 3, 4, 5, 6, 7 and 8) in taking photographs of an object O (see FIGS. 3 and 4). The camera 11 includes, in general, a hollow, boxlike body means 15, lens means 17 attached to the body means 15 for allowing lines of light LL (see FIG. 4) to pass from the object O being photographed into the interior 15' of the body means 15, and means for selectively allowing the lines of light LL entering the interior 15' of the body means 15 to enter the film cartridge 13.

The body means 15 may be constructed of any substantially rigid material such as plastic in any manner well known to those skilled in the art. While the body member 15 may be made in various sizes, it is preferably made in a size which is truly pocketable. For example, the size of the body means 15 may be approximately 4 ¾ by 2 ⅛ by 1 inch (12.065 by 5.397 by 2.54 cm.) The body means 15 may include an opening 16 (see FIGS. 3, 4 and 5) for reasons which will hereinafter become apparent.

The lens means 17 may be of any type of photographic lens well known to those skilled in the art. For example, the lens means may be built-in, standard lens, a zoom lens, or an interchangeable lens. In the drawings, the lens means 17 is shown as an interchangeable lens which is attached to the body means 15 by screw threads 19. It should be noted, however, that the lens means 17 may be attached to the body means 15 in numerous ways well known to those skilled in the art. It should also be noted that the body means 15 may include a portion 15" which extends along the length of the lens means 17 as shown in FIGS. 1, 2, 3 and 4. On othe other hand, the body means 15 may be constructed without the portion 15" so that it is of a substantially smaller size. When the body means 15 is constructed without the portion 15" or when the lens means 17 is extremely long, the lens means 17 will protrude from the body means 15 in the lengthwise direction.

The means for selectively allowing the line of light LL entering the interior 15' of the body means 15 to enter the film cartridge 13 preferably consists of a shutter means 21 (see FIGS. 3, 4 and 5). The shutter means 21 may consist of any type shutter well known to those skilled in the art such as a focal plane shutter. The shutter means 21 is preferably activated by a button 23 or the like (see FIG. 1) provided on the outside of the body means 15 and connected to the shutter means 21 by any means well known to those skilled in the art to allow the user of camera 11 to selectively activate the shutter means 21 to cause a photograph to be taken of the object O being photographed. It is believed that the above description is sufficient to enable any person skilled in the camera art to make and use the shutter means 21.

The camera 11 preferably includes a viewfinder means 25 (see FIGS. 2, 3, 4 and 5) for allowing the user of the camera 11 to selectively view the object O being photographed. The viewfinder means 25 may be constructed in any manner well known to those skilled in the art. For example, the viewfinder means 25 may consist of an aperture 27 provided through the body means 15 and a lens member 29 attached to the body means 15 adjacent the aperture 27.

The camera 11 also preferably includes means for selectively directing a line of sight LS (see FIG. 3) from the eye E of the user of the camera 11 between the viewfinder means 25 and the lens means 17 for allowing the user of the camera 11 to view the object O being photographed through the lens means 17. This means may be of any construction well known to those skilled in the art. For example, it may include a pentaprism 31 and a reflex mirror means 33 (see FIGS. 3, 4, and 5). The reflex mirror means 33 may consist of any typical reflex mirror means well known to those skilled in the art that is movable from a first position between the lens means 17 and the film cartridge 13 and a second position away from between the lens means 17 and the film cartridge 13. The reflex mirror means 33 may include a sliding mirror 35 which has a first position between the lens means 17 and the film cartridge 13 (see FIG. 3) for allowing the line of sight LS to pass between the viewfinder means 25 and the lens means 17 and which has a second position away from between the lens means 17 and the film cartridge 13 (see FIG. 4) for allowing the line of light LL to pass between the lens means 17 and the film cartridge 13. The reflex mirror means 33 preferably includes means for causing the sliding mirror member 35 to slide from the first position to the second position when the shutter means 21 is activated. This means for causing the sliding mirror member 35 to slide from the first position to the second position includes a swing-arm member 37 which is pivotally atached to the body means 15 by way of a pivot rod 39. The swing-arm member 37 may be operably attached to the sliding mirror member 35 by way of a Y-shaped portion 37' which coacts with a knob-like portion 35' of the sliding mirror member 35. More specifically, the knob-like portion 35' of the sliding mirror member 35 may be fixedly, nonrotatably attached to the Y-shaped portion 37 of the swing-arm member 37. However, means (not shown) may be provided for causing the sliding mirror member 35 to slightly rotate relative to the swing-arm member 37 when moved between first and second positions to prevent the sliding mirror member 35 from contacting other portions of the camera 11 such as the pentaprism 31 or the like. A spring member 41 is provided to urge the swing-arm member 37 to the position shown in FIG. 4 where the sliding mirror member 35 is in the second position. A catch member 43 is provided to selectively hold the swing-arm member 37 in the position shown in FIG. 3 wherein the sliding mirror member 35 is in the first position. The swing-arm member 37 is provided with a projecting member 37" which coacts with the catch member 43 to allow the swing-arm member 37 to be held in the position shown in FIG. 3. The catch member 43 is preferably associated with the shutter means 21 in a manner well known to those skilled in the art so that when the shutter means 21 is activated by the user of the camera 11 to take a photograph, the catch member 43 will release the swing-arm member 37 thereby allowing the sliding mirror member 35 to move to the second position as shown in FIG. 4.

The camera 11 preferably includes a film advance slide 45 (see FIGS. 3, 4 and 5) for use in a manner which will hereinafter become apparent. A post 47 extends from the film advance slide 45 through a slot 49 in the body means 15 (see FIG. 1) for allowing the film advance slide 45 to be manually activated by the user of the camera 11. The post 47 may also serve as a cam to force the reflex mirror means 33 to the first position as shown in FIG. 3 from the second position as shown in FIG. 4.

The camera 11 may include a focusing screen 51 positioned along the line of sight LS for reasons which will be apparent to those skilled in the art.

The film cartridge 13 includes an elongated strip of photographic film 53 (see FIG. 6). The film 53 has a first side 53' covered with a photographic emulsion 55 and has a second side 53" covered with a paper backing 57 (see FIGS. 8 and 9). The paper backing 57 has a series of numerical indicia 59 provided thereon (see FIGS. 9 & 10) for reasons which will hereinafter become apparent.

The film cartridge 13 includes a substantially non-transparent housing member 61 (see FIGS. 6, 7 and 8) for enclosing the film 53. The housing member 61 includes a first window means 63 and a first film support means 65 (see FIGS. 6 and 8) for aligning a first portion 67 of the film 53 within the first window means 63 with the photographic emulsion 55 of the first portion 67 of the film 53 being outwardly directed. The housing member 61 includes a second window means 69 and includes means for aligning a second portion 71 of the film 53 within the second window means 69 with the paper backing 57 and the numerical indicia 59 of the second portion 71 of the film 53 being outwardly directed and viewable therethrough (see FIGS. 6 and 8). The means for aligning the second portion 71 of the film 53 may include a pair of guide members 73 located on either side of the second window means 69 as clearly shown in FIGS. 6 and 8. A film identifying label 74 (see FIGS. 6, 7 and 8) or the like may be attached to the housing member 61 for allowing certain features of the film cartridge 13 to be identified in a manner well known to those skilled in the art. When the film cartridge 13 is positioned within the body means 15 of the camera 11 as shown in FIGS. 3, 4 and 5, the numerical indicia 59 and the film identifying lable 74 will be aligned with and viewable through the opening 16 in the body means 15 of the camera 11 for allowing the user of the camera 11 to determine how many exposures have been taken and the like.

The film cartridge 13 also includes a take-up roller means 75 (see FIGS. 6 and 8) rotatably mounted within the housing member 61 by way of pivots 77 or the like and aligned with the first window means 63 of the housing member 61 for receiving the film 53 after the film 53 has passed the first window means 63 of the housing member 61.

The film cartridge 13 also include a drive means for selectively causing the take-up roller means 75 to rotate thereby causing the film 53 to be wound around the take-up roller means 75. The drive means may consist of one or more gear members 79 operatively attached to one of the pivots 77 (see FIG. 8) in a manner well known to those skilled in the art. The gear members 79 are adapted to coact with the film advance slide 45 of the camera 11 when the film cartridge 13 is positioned within the interior 15' of the body means 15 of the camera 11 so that when the film advance slide 45 is manually moved in the direction of the arrow 81 in FIG. 5, the gear member 79 will be caused to rotate thereby causing the take-up roller means 75 to rotate. Also, by moving the film advance slide 45 in the direction of the arrow 81 in FIG. 5, the post 47 of the film advance slide 45 will contact the swing-arm member 37 of the reflex mirror means 33 when the reflex mirror means 33 is in the second position as shown in FIG. 4 for causing the reflex mirror means 33 to move to the first position as shown in FIG. 3.

Although the invention has been described and illustrated with respect to a preferred embodiment thereof, it is not to be so limited since changes and modifications may be made therein which are within the full intended scope of the invention.

I claim:

1. A photographic camera comprising: a hollow, boxlike body means; lens means attached to said body means for allowing lines of light to pass from an object being photographed into the interior of said body means; a film cartridge including a substantially non-transparent housing member, a strip of photographic film located within said housing member, an exposure window through said housing member for allowing light to enter said housing member therethrough and to expose a portion of said film, and a take-up spool for receiving said film after it has been exposed, said take-up spool being positioned behind said exposure window and in-line with the centermost rays of light passing through said exposure window, said film being positioned within said housing member with any exposed portion thereof substantially wound around said take-up spool and with any unexposed portion thereof substantially unconstrainedly located within said housing member; and means for selectively allowing said lines of light entering said interior of said body means to enter said exposure window of said film cartridge; said film cartridge being positioned within said interior of said body means with said lines of light passing between said lens means, said exposure window of said film cartridge and said portion of said film.

2. The photographic camera of claim 1 in which is included viewfinder means for allowing the user of said camera to selectively view the object being photographed, and in which is included means for selectively directing a line of sight between said viewfinder means and said lens means.

3. The photographic camera of claim 2 in which is included shutter means for selectively controlling the exposure of said film through said exposure window of said film cartridge.

4. The photographic camera of claim 3 in which said means for allowing a line of sight to pass between said viewfinder means and said lens means includes a reflex mirror means, said reflex mirror means including a sliding mirror member which has a first position between said lens means and said exposure window of said film cartridge for allowing said line of sight to pass between said viewfinder means and said lens means and a second position away from between said lens means and said exposure window of said film cartridge for allowing said lines of light to pass between said lens means and said exposure window of said film cartridge, said reflex mirror means including means for causing said sliding mirror member to slide from said first position to said second position when said shutter means is activated to allow exposure of said film.

5. The photographic camera of claim 1 in which said film cartridge includes drive means for selectively causing said take-up spool to rotate thereby causing said film to be wound around said take-up spool with any unexposed portion of said film moving in substantially the same direction and at substantially the same speed as any exposed portion of said film that it may come in contact with.

6. An improved photographic camera of the type including a hollow, boxlike body, a film cartridge positioned within said body, said film cartridge including a strip of photographic film, an exposure window for allowing light to selectively enter said film cartridge therethrough and to expose a portion of said film, and a take-up spool for receiving said film after exposure thereof, a lens, a viewfinder, means for directing a line of sight between said lens and said viewfinder, and means for selectively allowing lines of light to pass between said lens and said exposure window of said film cartridge, wherein the improvement comprises: said take-up spool being positioned behind said exposure window and in-line with the centermost rays of light passing through said exposure window and said film being positioned within said housing member with any exposed portions thereof being substantially wound around said take-up spool and with any unexposed portions thereof being substantially unconstrainedly located within said housing member.

7. The improved photographic camera of claim 6 in which said film cartridge includes drive means for selectively causing said take-up spool to rotate thereby causing said film to be wound around said take-up spool with any unexposed portion of said film moving in substantially the same direction and at substantially the same speed as any exposed portion of said film that it may come in contact with.

8. A film cartridge for use with a photographic camera, said film cartridge comprising:

(a) an elongated strip of photographic film, said film having a first side covered with a photographic emulsion and having a second side covered with a paper backing, said paper backing having a series of numerical indicia provided thereon;

(b) a substantially nontransparent housing member for enclosing said film, said housing member including a first window means for allowing light to enter said housing member therethrough and to expose a portion of said film and including first film support means for aligning a first portion of said film within said first window means with said photographic emulsion of said first portion of said film being outwardly directed, said housing member including a second window means and including means for aligning a second portion of said film within said second window means with said paper backing of said second portion of said film being outwardly directed;

(c) take-up roller means mounted within said housing member for receiving said film after said film has passed said first window means of said housing member, said take-up roller means being positioned behind said first window means and in-line with the centermost rays of light passing through said first window means, said film being positioned within said housing member with any exposed portion thereof substantially wound around said take-up roller means and with any unexposed portion thereof substantially unconstrainedly located within said housing member; and (d) drive means for selectively causing said take-up roller means to rotate thereby causing said film to be wound around said take-up roller means with any unexposed portion of said film moving in substantially the same direction and at substantially the same speed as any exposed portion of said film which it may come in contact with.

9. A photographic camera comprising: a hollow, boxlike body means; lens means attached to said body means for allowing lines of light to pass from an object being photographed into the interior of said body means; a film cartridge including a substantially nontransparent housing member, a strip of photographic film located within said housing member, an exposure window through said housing member for allowing light to enter said housing member therethrough and to expose a portion of said film, and a take-up spool for receiving said film after it has been exposed, said take-up spool being positioned behind said exposure window and in-line with the centermost rays of light passing through said exposure window; means for selectively allowing said lines of light entering said interior of said body means to enter said exposure window of said film cartridge; said film cartridge being positioned within said interior of said body means with said lines of light passing between said lens means, said exposure window of said film cartridge, and said portion of said film; shutter means for selectively controlling the exposure of said film through said exposure window of said film cartridge; viewfinder means for allowing the user of said camera to selectively view the object being photographed; and means for selectively directing a line of sight between said viewfinder means and said lens means, said means including a reflex mirror means and a pentaprism, said reflex mirror means including a sliding mirror member and means for causing said sliding mirror member to slide between a first position between said lens means and said exposure window of said film cartridge with said pentaprism positioned between said sliding mirror member and said viewfinder for guiding said line of sight from said viewfinder to said sliding mirror member and a second position with at least a portion of said sliding mirror member positioned between said pentaprism and said viewfinder and with said sliding mirror away from between said lens means and said exposure window of said film cartridge for allowing said lines of light to pass between said lens means and said exposure window of said film cartridge when said shutter means is activated to allow exposure of said film.

* * * * *